United States Patent
Keskes et al.

(10) Patent No.: US 6,771,800 B2
(45) Date of Patent: Aug. 3, 2004

(54) METHOD OF CHRONO-STRATIGRAPHIC INTERPRETATION OF A SEISMIC CROSS SECTION OR BLOCK

(75) Inventors: Naamen Keskes, Pau (FR); Sébastien Guillon, Pessac (FR); Marc Donias, Merignac (FR); Pierre Baylou, Bordeaux (FR); Fabien Pauget, Villeneuve d'Ornon (FR)

(73) Assignee: ELF Exploration Production (FR)

( * ) Notice: Subject to any disclaimer, the term of this patent is extended or adjusted under 35 U.S.C. 154(b) by 622 days.

(21) Appl. No.: 09/841,993

(22) Filed: Apr. 25, 2001

(65) Prior Publication Data

US 2001/0036294 A1 Nov. 1, 2001

(30) Foreign Application Priority Data

Apr. 26, 2000 (FR) .............................. 00 05299

(51) Int. Cl.[7] ................................................ G06T 3/00
(52) U.S. Cl. ........................................ 382/109; 382/168
(58) Field of Search ................................ 382/109, 168, 382/276, 293; 367/14, 38, 68, 74; 702/14, 16, 17; 250/253; 324/323

(56) References Cited

U.S. PATENT DOCUMENTS

| | | | | |
|---|---|---|---|---|
| 5,148,494 A | * | 9/1992 | Keskes ........................... | 382/1 |
| 5,206,916 A | | 4/1993 | Castelaz ....................... | 382/14 |
| 5,586,082 A | | 12/1996 | Anderson et al. .............. | 367/73 |
| 5,671,136 A | | 9/1997 | Willhoit, Jr. ................. | 364/421 |
| 6,125,203 A | * | 9/2000 | Keskes et al. ............... | 382/171 |
| 6,278,949 B1 | * | 8/2001 | Alam ........................... | 702/16 |
| 6,628,806 B1 | * | 9/2003 | Keskes et al. ............... | 382/109 |

FOREIGN PATENT DOCUMENTS

FR       2765707 A1    1/1999   ............ G06K/9/48

OTHER PUBLICATIONS

M. Donias, et al., "Curvature Of Oriented Patterns: 2–D and 3–D Estimation From Differential Geometry", *Proceedings of 1998 International Conference On Image Processing*, Chicago, Illinois, Oct. 4–7, 1998, vol. 1, pp. 236–240.

* cited by examiner

*Primary Examiner*—Andrew W. Johns
(74) *Attorney, Agent, or Firm*—Ostrolenk, Faber, Gerb & Soffen, LLP (57) ABSTRACT

The method uses the image obtained by accumulating continuity curves representative of seismic horizons so as to determine the geological strata constituting the seismic section, such as they were deposited and not such as they are observed today. To do this, the method defines a transformation of the vertical scale of the seismic section, scale measured in seismic times, into a geological vertical scale measured in geological times. This transformation is based on an equalization of histograms. Starting from equalized histograms, the method makes it possible to determine equalized seismic sections which are used to determine the rates of sedimentation which governed the depositions of geological strata. In particular, it highlights geological hiatuses, that is to say erosions and gaps.

4 Claims, 5 Drawing Sheets

FIG. 1a

FIG_1b

FIG_2a

FIG_2b

FIG_4

FIG_5a

FIG_5b

FIG_6

METHOD OF CHRONO-STRATIGRAPHIC INTERPRETATION OF A SEISMIC CROSS SECTION OR BLOCK

The present invention relates to a method of chrono-stratigraphic interpretation of a seismic cross section or block, that is to say a geological record of a seismic cross section or block.

The present invention lies in the context of oil exploration and allows a switch from the geophysical domain to the geological domain.

STATE OF THE ART

The method according to the invention applies to seismic cross sections or seismic blocks. A seismic cross section is formed by the juxtaposition in a plane of sampled one-dimensional signals referred to as seismic traces. Likewise, a seismic block is formed by the juxtaposition of seismic traces in a volume. The expression "seismic section" refers either to a seismic cross section or to a slice of seismic block. A seismic section offers a view of the juxtaposition of the seismic traces contained in the plane of section. These views are seismic images, which will be referred to as seismic image sections in the account of the implementation of the method. In a seismic image, the luminous intensity of a pixel is proportional to the seismic magnitude represented by the one-dimensional signals.

The chrono-stratigraphic interpretation of seismic cross sections or seismic blocks involves the synthesis of seismic horizons in the cross section or the block. Several methods have been devised for carrying out syntheses of horizons. Their results are better or worse depending in fact on the geological environment whose image is offered by the seismic section. Thus, in regions where the geological strata are of the monoclinal dominant type, the synthesis of horizons by measurement of similarity between neighbouring traces gives good results. On the other hand, in zones where the geology is more disturbed, it is preferable firstly to calculate the gradient vectors of the luminous intensity between neighbouring pixels and then to implement a horizon synthesis by integrating the orientation field of the calculated gradient vectors.

The thesis by Marc Donias, submitted on Jan. 28, 1999 to the University of Bordeaux I and entitled "Caractérisation de champs d'orientation par analyse en composantes principales et estimation de la courbure. Application aux images sismiques", [Characterization of orientation fields by principal components analysis and estimation of curvature. Application to seismic images], describes in detail the abovementioned schemes for carrying out horizon synthesis.

Horizon synthesis applied to each pixel of the seismic image section creates as many horizons as there are pixels in the image. The seismic horizons, in the guise of markers of the local geology, cannot intersect. On the other hand, they can converge, merge locally and blend into one, or even diverge. The merging of horizons leads to the concept of accumulation of syntheses.

To carry out an accumulation of the horizon syntheses, one defines a matrix which is identical in size to the seismic image. Each element of the matrix is associated with a pixel of the image and is initially assigned a zero value. For each pixel of the image a continuity curve is calculated which corresponds to the synthesis of the horizon passing through the said pixel. All the continuity curves are transverse to the vertical dimension of the image. When calculating the continuity curves, an element of the matrix is incremented by one unit each time the pixel with which it is associated in the image is crossed by a continuity curve.

The calculation of a continuity curve transverse to the vertical dimension of the image section at a given pixel consists in calculating the gradients of luminous intensity for all the pixels included in a neighbourhood of the chosen pixel, then in calculating a local gradient from the gradient measurements obtained over the neighbourhood and in assigning the local gradient to the chosen pixel. The continuity curve is then developed by marching transversely from pixel to pixel starting from the chosen pixel up to the vertical lateral boundaries of the image, in the two directions indicated by the local gradient and its additive inverse, by iteratively repeating the previous two steps.

When all the pixels of the seismic image section have been scanned, the matrix carrying out the accumulations of syntheses is represented in the form of a new image in which each pixel possesses a luminous intensity proportional to the number aggregated in the corresponding element of the matrix, which number is at least equal to one. The boundaries observed on this image give a good idea of the organization of the geological strata in the subsoil.

CONTRIBUTION OF THE INVENTION

The method according to the invention exploits the image obtained by accumulation of syntheses to determine the geological depositions such as they were deposited and not such as they are observed today in the form of strata. To do this, the method defines a transformation of the vertical scale of the seismic section measured in seismic times into a geological vertical scale measured in geological times. The method thus makes it possible to define the rates of sedimentation which governed the depositions of the geological strata. In particular, it highlights the geological hiatuses, that is to say erosions and gaps.

DEFINITION OF THE INVENTION

The subject of the present invention is a method of chrono-stratigraphic interpretation of a seismic image section S, comprising a horizontal dimension or width and a vertical dimension or height in the direction of the subsoil and consisting of columns of pixels, which consists in:

defining a matrix M identical in size to the image section S and consisting of elements each of which is associated with a pixel of the image section S and is initially assigned a zero value, for each pixel i of the image section S, calculating a continuity curve $C_i$ passing through the said pixel and transverse to the vertical dimension of the image section S, incrementing an element of the matrix M by one unit each time the pixel with which it is associated in the image section S is crossed by a curve $C_i$, the said method being characterized in that it furthermore consists in:

constructing, for each column c of the matrix M, a histogram $H_c$ consisting of a number of classes which is equal to the number of elements of the said column c, each class corresponding to one of the elements of the column c and containing a number of samples which is equal to the value aggregated in the relevant element of the matrix M, which value is equal to the number of curves passing through the pixel associated with the said element, the total number of samples distributed in the histogram constructed for each column being equal to the total number of pixels in the image section S, equalizing each histogram Hc so as to produce an equalized histogram Hc', defining an empty image section S', whose width in pixels is identical to the width in pixels of the image section S and whose height in pixels is equal to the number of classes of the histograms Hc', assigning the distribution defined by the equalized histogram Hc' to each column c' of the image section S' by allocating each pixel of the column c' the cardinality of the content of the associated class of Hc', delimiting in the image section S' the groups of contiguous pixels containing samples and labelling each of the said groups, allocating each pixel of the image section S the label given to the pixel group to which it was assigned in the image section S' and displaying the labelled image section S.

According to another characteristic, the calculation of the continuity curve Ci transverse to the vertical dimension of the image section S at a given pixel i consists in:

calculating the gradients of luminous intensity for all the pixels included in a neighbourhood Vi of pixel i, calculating a local gradient Gi from the gradient measurements obtained over the neighbourhood Vi and assigning the gradient Gi to pixel i, marching transversely from pixel to pixel starting from pixel i up to the vertical lateral boundaries of the image section S in the two directions indicated by the gradient Gi and its additive inverse –Gi, by iteratively repeating the previous two steps.

The present invention can also be applied to three-dimensional seismic image blocks. The subject of the present invention is therefore also a method of chrono-stratigraphic interpretation of a seismic image block B comprising two horizontal dimensions, namely width and depth, and a vertical dimension or height in the direction of the subsoil and consisting of columns of pixels, which consists in:

defining a block N identical in size to the image block B and consisting of elements each of which is associated with a pixel of the image block B and is initially assigned a zero value, for each pixel i of the image block B, calculating a continuity surface Si passing through the said pixel and transverse to the vertical dimension of the image block B, incrementing an element of the block N by one unit each time the pixel with which it is associated in the image block B is crossed by a surface Si, the said method being characterized in that it furthermore consists in, constructing, for each column c of the block N, a histogram Hc consisting of a number of classes which is equal to the number of elements of the said column c, each class corresponding to one of the elements of the column c and containing a number of samples which is equal to the value aggregated in the relevant element of the block N, which value is equal to the number of surfaces passing through the pixel associated with the said element, the total number of samples distributed in the histogram constructed for each column being equal to the total number of pixels in the image block B, equalizing each histogram Hc so as to produce an equalized histogram Hc', defining an empty image block B', whose width in pixels and whose depth in pixels are identical to the width in pixels and to the depth in pixels of the image block B, and whose height in pixels is equal to the number of classes of the histograms Hc', assigning the distribution defined by the equalized histogram Hc' to each column c' of the image block B' by allocating each element of the column c' the content of the associated class of Hc', delimiting in the image block B' the groups of contiguous pixels containing samples and labelling each of the said groups, allocating each pixel of the image block B the label given to the pixel group to which it was assigned in the image block B' and displaying the labelled image block B.

According to another characteristic, the calculation of the continuity surface Si transverse to the vertical dimension of the image block B at a given pixel i consists in:

calculating the gradients of luminous intensity for all the pixels included in a neighbourhood of each pixel i of a column of pixels Ki, for each pixel i of column Ki, performing a principal components analysis on the gradients calculated in the neighbourhood Vi of pixel i so as to determine a pair of direction vectors directed along the plane tangent to the surface Si at pixel i of column Ki, marching concentrically from column to column starting from column Ki up to the vertical lateral boundaries of the image block B, by iteratively repeating the previous two steps.

COMPLETE DESCRIPTION

The method according to the invention is a method of automatic chrono-stratigraphic interpretation of a seismic image section. Referring to the FIGS., a mode of Implementing this method is given hereinbelow.

Figure 1A:
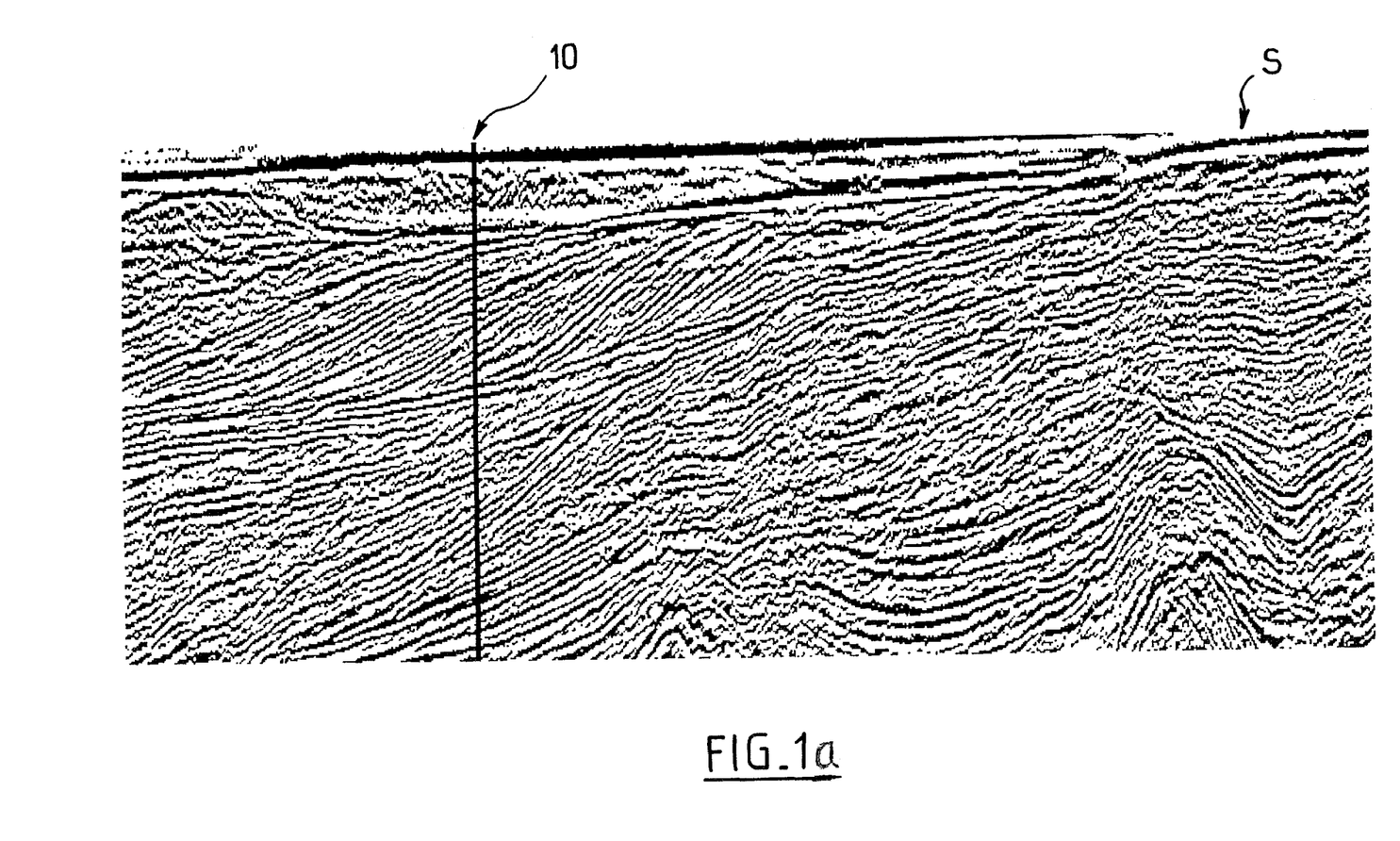
FIGS. 1a and 1b represent, on different scales, the same seismic image section before applying the method according to the invention.

FIG. 1a represents a seismic image section S. The image section S is dubbed seismic since it represents a picture of the subsail arising from a seismic exploration survey. The image section S comprises two dimensions; it is defined by a horizontal extension along a horizontal axis and by a vertical extension along a vertical axis in the direction of the subsoil. The image section S is composed of pixels regularly distributed according to a horizontal pitch on the horizontal axis and a vertical pitch on the vertical axis. The image section S contains in particular a number of columns of pixels which is equal to the quotient of the horizontal extension divided by the horizontal pitch and a number of pixels per column which is equal to the quotient of the vertical extension divided by the vertical pitch. In particular, the vertical black line 10 in FIG. 1a represents a column of pixels which is the basis for the subsequent Figures in the description of the method.

To implement the method according to the invention, one defines a matrix M which is identical in size to the image section S. The number of rows of the matrix M is equal to the number of pixels in a column of the image section S and the number of columns of the matrix M, which is equal to the number of columns of the image section S, is equal to the number of pixels in a line of this image section. The matrix M thus consists of as many elements as there are pixels in the image section S and each element is associated with a pixel of the image section S. All the elements of the matrix M are integers initially having a zero value.

For each pixel i of the image section S, one calculates a continuity curve Ci passing through the said pixel and transverse to the vertical dimension of the image section S. The calculation of this curve Ci involves calculating a local gradient Gi of the luminous intensity at the pixel i.

The luminous intensity associated with a pixel is defined as the representation in a palette, for example a palette of grey levels, of a seismic attribute, for example the amplitude of the seismic signal; under the conditions adopted in the example, a high amplitude would be manifested by a bright pixel and a low amplitude by a dark pixel. It is then possible to calculate a gradient of luminous intensity Gi between a pixel i and its neighbours, which gradient Gi is in fact the gradient of the relevant seismic attribute. The gradient Gi is assigned to the pixel i. The gradient Gi comprises a horizontal component and a vertical component and it is determined in particular by a principal components analysis applied to all the gradients calculated over all the pixels included in a neighbourhood Vi of the pixel i. The neighbourhood Vi is defined by a window centred on pixel i, preferably a window of size equal to 7 pixels times 7 pixels. The principal direction of elongation of the cluster of measurements of gradients in the neighbourhood Vi, given by the direction of the first axis of inertia, makes it possible to determine a local direction of the gradient Gi, which direction is allocated to pixel i.

Figure 1B:
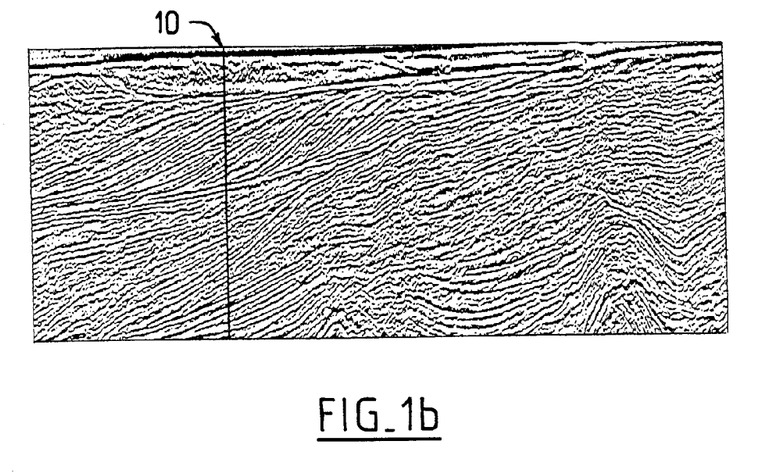
Figure 2A:
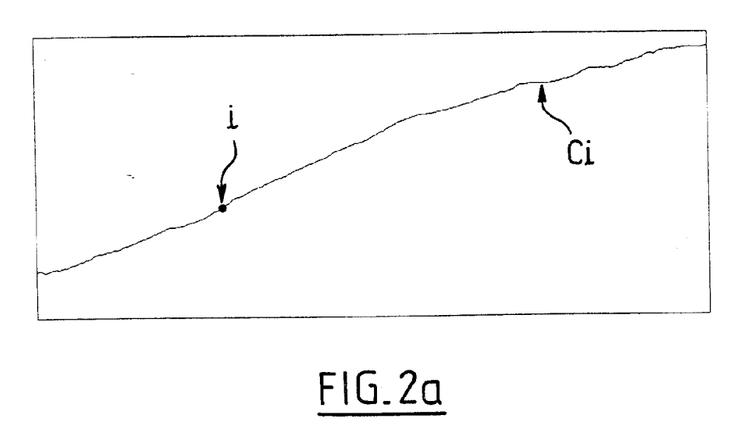
FIG. 2a represents a continuity curve associated with a pixel of the seismic image section and FIG. 2b represents a view of all the continuity curves.

FIG. 2a shows a continuity curve Ci associated with a pixel i. The curve Ci is dubbed a continuity curve since it extends within the image from pixel i towards pixels exhibiting characteristics similar to those of pixel i. The curve Ci is developed transversely to the vertical dimension of the image section S, which is shown in FIG. 1b to the same scale as FIG. 2a and on which may be discerned the horizon synthesized by the curve Ci. The curve Ci is obtained by marching from pixel to pixel in the successive directions determined by the successive gradients Gi calculated continuously and their additive inverses −Gi. As a consequence, the value of the derivative of the continuity curve Ci at each of the pixel points of which it consists is the value of the local gradients calculated at the same pixels.

Each time a continuity curve Ci passes through a pixel i, the element corresponding to pixel i of the matrix M is incremented by one unit. The elements of the matrix M are as it were counters associated with the pixels of the image section S.

Figure 2B:
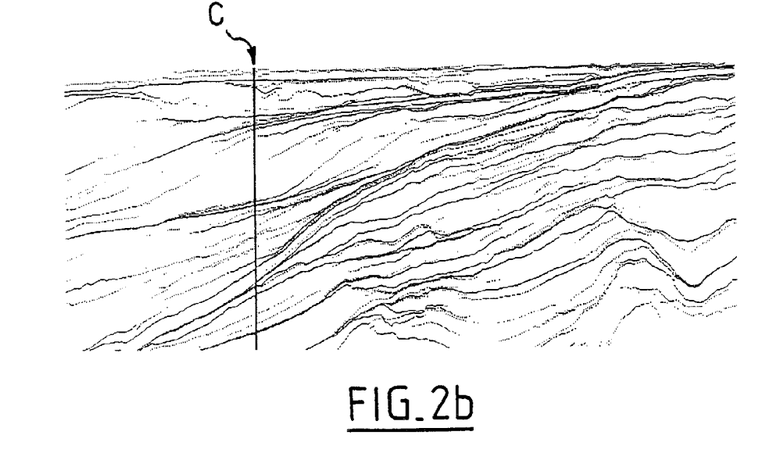

FIG. 2b shows a view of all the transverse continuity curves. The bolder the plot of the transverse curves appears, the larger is the number of superimposed transverse curves. More specifically, if the image section S portrays, for example, the value of the amplitude of the seismic signal, the curve Ci, started at pixel i, will search for a continuity of amplitude across the image section S on the basis of a similarity with the amplitude observed at pixel i. If the value of the amplitude at pixel i is very high, a curve developed from pixel i in the image will tend to follow a geological marker.

Once all the continuity curves have been calculated, the elements of the matrix M contain the results of the counts of the continuity curves passing through each pixel of the image section S according to the strict element—pixel correspondence. It is precisely the content of the matrix M which is displayed in FIG. 2b.

Figure 3A:
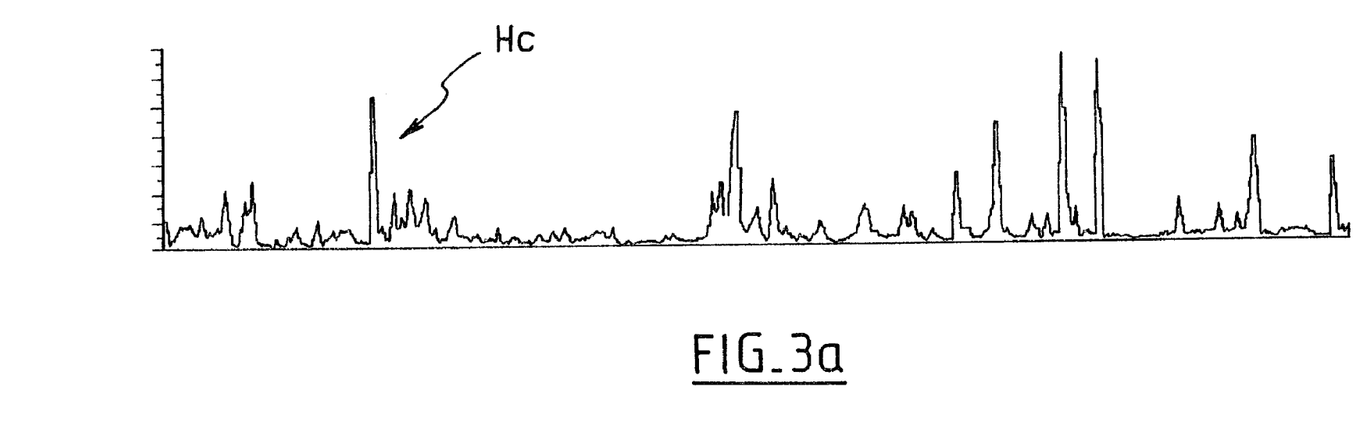
FIG. 3a represents a histogram associated with a vertical of FIG. 2b
Figure 3B:
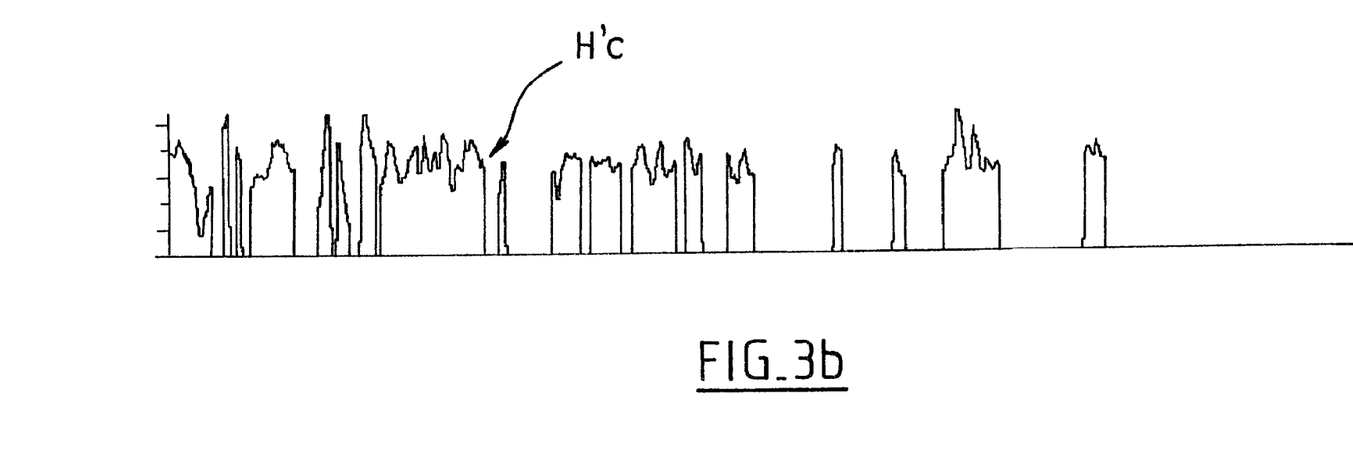
FIG. 3b shows the same histogram equalized.

For each column of the matrix M, which column corresponds to a column of pixels picked from the image represented in FIG. 2b, a histogram Hc is constructed, like the one represented in FIG. 3a, and which is associated with the column c indicated by the vertical black line in FIG. 2b. This histogram consists of a number of classes which is equal to the number of pixels in the said column c. Each class of the histogram is associated with an element in the column of the matrix M, which element corresponds to a pixel in the corresponding column of pixels of the image section S; the larger the number of continuity curves passing through this pixel, the fuller the corresponding class of Hc. Accordingly, the histogram Hc of FIG. 3 exhibits the distribution of the continuity curves over the vertical 10 plotted on the image section S, which distribution is stored precisely in the corresponding column of the matrix M associated with the image section S.

The number of samples contained in the classes of the various histograms, associated with the various columns, varies between a minimum and a maximum, both being positive integers. The minimum is one since there is always at least one continuity curve passing through each pixel. The maximum is variable but it is bounded by the total number of continuity curves, which is none other than the total number of pixels of the image section S.

An equalization algorithm is then applied to each histogram Hc to produce a corresponding equalized histogram Hc'. To do this, it will for example be possible to use the algorithms described in the work by Messrs R. Gonzalez and R. Woods entitled "Digital Image Processing" and published in 1992 by Addison-Wesley, or else in the work by Messrs J-P Coquerez and S. Philipp entitled "Analyse d'images: filtrage et segmentation" [Image Analysis: filtering and segmentation] and published in 1995 by Masson. The application of the histogram equalization algorithm to the histogram of FIG. 3a redistributes the population ranked according to a new distribution represented by the histogram Hc' of FIG. 3b. The histogram equalization algorithm, whose prime aim is to raise the contrast of an image, has the aim here of redistributing the ranked population by splitting it up into a larger number of classes and in a more equally distributed manner. The number of classes of the equalized histogram Hc' is equal to the number of classes of the histogram Hc multiplied by an expansion factor dependent on the resolution desired.

In the implementation of the method according the invention, one defines a new image section S' whose width in pixels is identical to that of the image section S and whose height in pixels is equal to the number of classes of the histogram Hc'. Initially, the image section S' is empty, that is to say all its pixels appear black.

A new image is constructed in the image section S' on the basis of all the equalized histograms by assigning the distribution defined by the corresponding equalized histogram to each column of the image section S'. To do this, the samples newly distributed into the classes of the equalized histograms are used to calculate a luminous intensity for each pixel associated with each class. The luminous intensity of a pixel in the image section S', in a palette of grey levels for example, is dependent on the number of samples contained in the class associated with the pixel. Thus the luminous intensity of a pixel will be zero and the pixel will appear black in the image section S' if there is no sample in the class associated with the pixel. Likewise, the luminous intensity will be non-zero and the pixel will appear grey, brighter or duller, when the associated class contains a greater or lesser number of samples.

It is important to note that the ranked population is the same for all the histograms, whether or not they are equalized. Each histogram exhibits a different distribution thereof but the sum of the content of all the classes is identical for all the histograms. It is precisely this invariant which makes it possible to regard the image section S' as a chrono-stratigraphic image section, that is to say that the boundaries which it highlights are regarded as isochrones in the geological sense.

Figure 4:
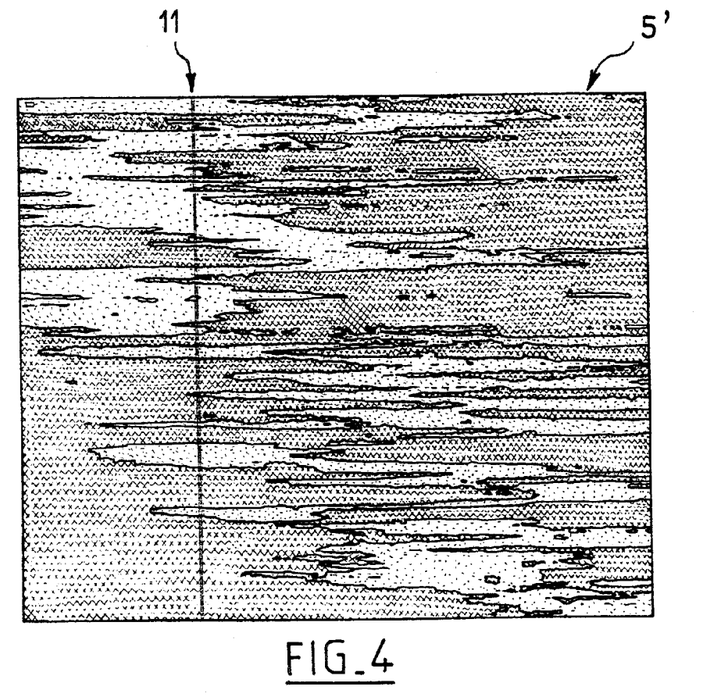
FIG. 4 represents an equalized image section, referred to as a chrono-stratigraphic image section.

FIG. 4 shows the chrono-stratigraphic image section S' constructed from the equalized histograms. The transformation performed here makes it possible to switch from a depthwise geophysical vertical scale graduated in meters or in milliseconds to a geological time scale graduated in millions of years. In particular, one will note the vertical line 11 which demarcates in FIG. 4 the column of pixels which was initially chosen in FIG. 1a.

The chrono-stratigraphic image section S' is then binarized by allocating the value one at every pixel containing a non-zero value and by retaining the value zero at every informationless pixel. In the binarized image, represented by FIG. 5a, white zones appear on a black background. A white zone indicates that the pixels of the zone contain at least some seismic information whilst the black background indicates an absence of information, that is to say there is no sample in the associated classes of the equalized histograms. From a geological point of view, the black background reveals periods of gap or periods of erosion, since there is an absence of deposition of sediments during the periods indicated by any black segment observed on a vertical of the chrono-stratigraphic image section S'.

Figure 5A:
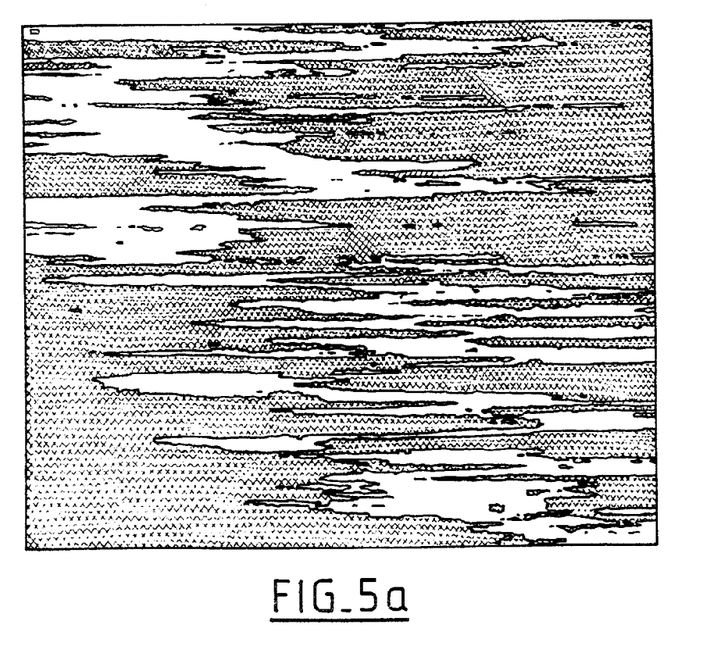
FIG. 5a represents a binarized equalized image section and FIG. 5b shows the same image section labelled.
Figure 5B:
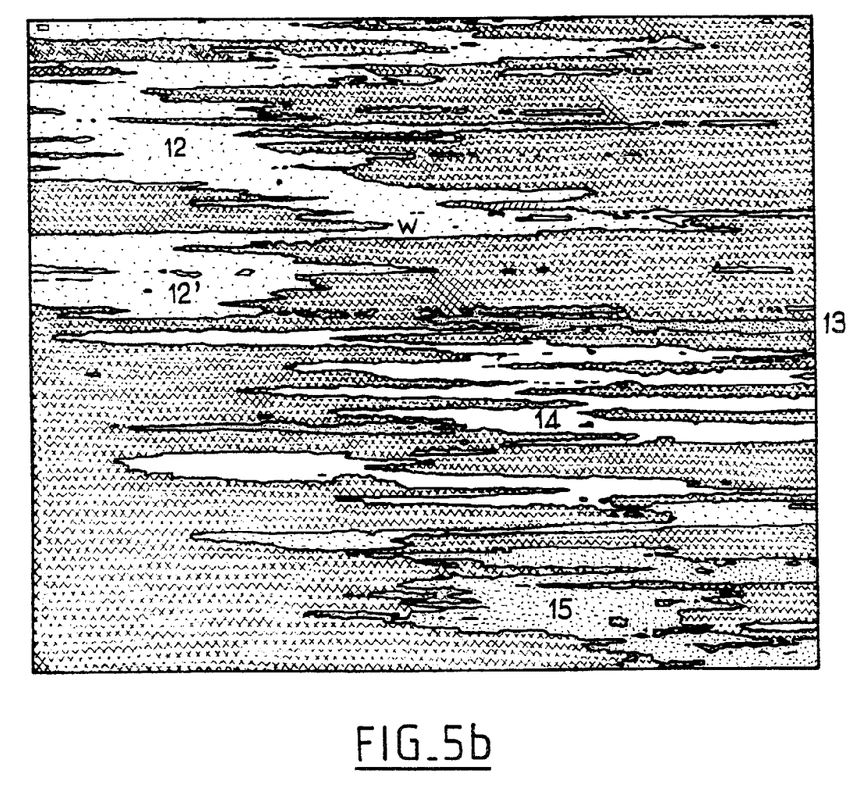

The binarized image is labelled by allocating entirely different patterns or colours to the connected white zones so that two separate white zones never possess the same pattern or the same colour. FIG. 5b shows the result of a labelling of the binarized image section 5a.

Figure 6:
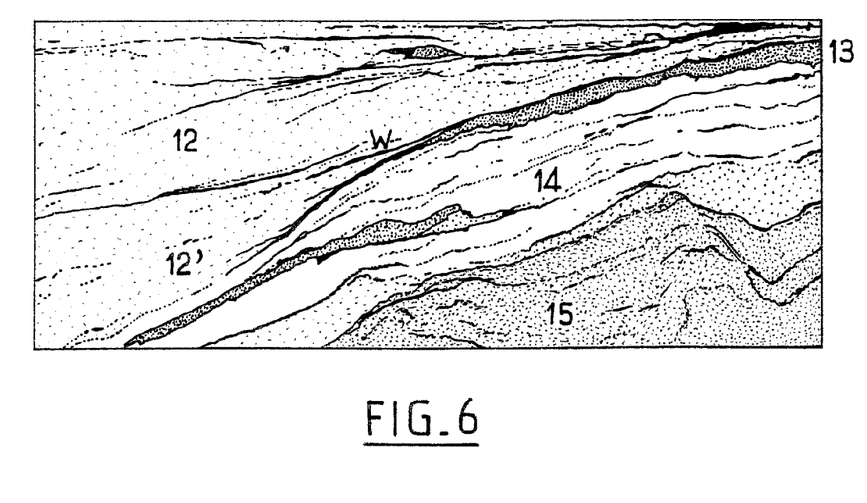
FIG. 6 represents a labelled seismic image section after applying the method according to the invention.

Finally, the transformation inverse to the histogram equalization is applied to each column of the image section 5b, that is to say the samples ranked by the equalized histogram are restored to their initial class of the original histogram. The original cross section is then reconstructed by allocating each pixel the colour which the labelling has allocated it. The result of the inverse transformation is depicted in FIG. 6. The labelled zones numbered from 12 to 15 in FIG. 5b correspond to the zones similarly numbered in FIG. 6. In particular, in FIG. 5b it may be noted that zone 12 is almost subdivided into two zones 12 and 12' but since these two zones are linked by a small isthmus w, they inherit the same labelling. In FIG. 6, it is also possible to go from 12 to 12' since their separation is discontinuous owing to the existence of the isthmus w.

FIG. 6 is very close to a genuine geological section. The zones with the same pattern are zones of relatively regular and homogeneous deposition of sediments. Two zones with different patterns in contact tend to indicate a change of geological formation, that is to say a new deposition regime such as, for example, that created by switching from a transgressive phenomenon to a regressive phenomenon. Furthermore, by recognizing any geological markers contained in the labelled image section depicted in FIG. 6 it is possible to date in a consistent manner in space all of the geological events observed.

The whole of the method, according to the invention, is also applicable in three dimensions in a seismic image block. A seismic image block is defined by two horizontal axes and a vertical axis in the direction of the subsoil. In this implementation, continuity surfaces transverse to the vertical dimension of the image block are the counterparts of the continuity curves transverse to the vertical dimension of the image section and only the step of calculating these surfaces differs in the application of the method to the image block.

To determine the continuity surfaces of the image block passing through all the pixels of the image block, all the columns of the image block are scanned in succession. For a chosen column Ki of the image block, all the planes tangent to the continuity surfaces at each of the pixels forming the column Ki are determined simultaneously. To do this, one firstly calculates a local gradient of luminous intensity $Gi$ at each pixel of the column Ki, in a neighbourhood Vi of the relevant pixel; the neighbourhood Vi is here a small cube centred on the relevant pixel, for example a cube of 7×7×7 pixels. The gradients are vectors having three components along the three dimensions of the image block. They are determined at each pixel i of column Ki by a principal components analysis applied to all the gradients calculated on all the pixels included in the neighbourhood Vi of pixel i. The three-dimensional principal components analysis on the gradients calculated in the neighbourhood Vi of a pixel i leads to the determination of three orthogonal vectors, namely a principal vector Fi1 associated with the first axis of inertia defining the line of greatest slope of the plane tangent to pixel i, a principal vector Fi2 associated with the second axis of inertia orthogonal to the previous axis and directed along the plane tangent to the pixel i and a principal vector Fi3 associated with the third axis of inertia orthogonal to the plane tangent to the pixel i. A pair of direction vectors (Fi1, Fi2) directed along the plane tangent to the sought-after continuity surface and passing through this pixel are thus obtained at each pixel i of column Ki. The procedure described above is iteratively repeated by propagating the principal components analyses concentrically from column to column starting from column Ki up to the vertical lateral boundaries of the image block.

What is claimed is:

1. Method of chrono-stratigraphic interpretation of a seismic image section S which comprises a horizontal dimension or width and a vertical dimension or height in the direction of the subsoil and which consists of columns of pixels, consisting in:

defining a matrix M identical in size to the image section S and consisting of elements each of which is associated with a pixel of the image section S and is initially assigned a zero value, for each pixel i of the image section S, calculating a continuity curve Ci passing through the said pixel and transverse to the vertical dimension of the image section S, incrementing an element of the matrix M by one unit each time the pixel with which it is associated in the image section S is crossed by a curve Ci, and characterized in that it furthermore consists in:

constructing, for each column c of the matrix M, a histogram Hc consisting of a number of classes which is equal to the number of elements of the said column c, each class corresponding to one of the elements of the column c and containing a number of samples which is equal to the value aggregated in the relevant element of the matrix M, which value is equal to the number of curves passing through the pixel associated with the said element, the total number of samples distributed in the histogram constructed for each column being equal to the total number of pixels in the image section S, equalizing each histogram Hc so as to produce an equalized histogram Hc', defining an empty image section S', whose width in pixels is identical to the width in pixels of the image section S and whose height in pixels is equal to the number of classes of the histograms Hc', assigning the distribution defined by the equalized histogram Hc' to each column c' of the image section S' by allocating each pixel of the column c' the cardinality of the content of the associated class of Hc', delimiting in the image section S' the groups of contiguous pixels containing samples and labelling each of the said groups, allocating each pixel of the image section S the label given to the pixel group to which it was assigned in the image section S' and displaying the labelled image section S.

2. Method according to claim 1, characterized in that the calculation of the continuity curve Ci transverse to the vertical dimension of the image section S at a given pixel i consists in:

calculating the gradients of luminous intensity for all the pixels included in a neighbourhood Vi of pixel i, calculating a local gradient Gi from the gradient measurements obtained over the neighbourhood Vi and assigning the gradient Gi to pixel i, marching transversely from pixel to pixel starting from pixel i up to the vertical lateral boundaries of the image section S in the two directions indicated by the gradient Gi and its additive inverse −Gi, by iteratively repeating the previous two steps.

3. Method of chrono-stratigraphic interpretation of a seismic image block B comprising two horizontal dimensions, namely width and depth, and a vertical dimension or height in the direction of the subsoil and consisting of columns of pixels, consisting in:

defining a block N identical in size to the image block B and consisting of elements each of which is associated with a pixel of the image block B and is initially assigned a zero value, for each pixel i of the image block B, calculating a continuity surface Si passing through the said pixel and transverse to the vertical dimension of the image block B, incrementing an element of the block N by one unit each time the pixel with which it is associated in the image block B is crossed by a surface Si, and characterized in that it furthermore consists in, constructing, for each column c of the block N, a histogram Hc consisting of a number of classes which is equal to the number of elements of the said column c, each class corresponding to one of the elements of the column c and containing a number of samples which is equal to the value aggregated in the relevant element of the block N, which value is equal to the number of surfaces passing through the pixel associated with the said element, the total number of samples distributed in the histogram constructed for each column being equal to the total number of pixels in the image block B, equalizing each histogram Hc so as to produce an equalized histogram Hc', defining an empty image block B', whose width in pixels and whose depth in pixels are identical to the width in pixels and to the depth in pixels of the image block B, and whose height in pixels is equal to the number of classes of the histograms Hc', assigning the distribution defined by the equalized histogram Hc' to each column c' of the image block B' by allocating each element of the column c' the content of the associated class of Hc', delimiting in the image block B' the groups of contiguous pixels containing samples and labelling each of the said groups, allocating each pixel of the image block B the label given to the pixel group to which it was assigned in the image block B' and displaying the labelled image block B.

4. Method according to claim 3, characterized in that the calculation of the continuity surface Si transverse to the vertical dimension of the image block B at a given pixel i consists in:

calculating the gradients of luminous intensity for all the pixels included in a neighbourhood of each pixel i of a column of pixels Ki, for each pixel i of column Ki, performing a principal components analysis on the gradients calculated in the neighbourhood Vi of pixel i so as to determine a pair of direction vectors directed along the plane tangent to the surface Si at pixel i of column Ki, marching concentrically from column to column starting from column Ki up to the vertical lateral boundaries of the image block B, by iteratively repeating the previous two steps.

* * * * *